Patented Jan. 15, 1952

2,582,303

UNITED STATES PATENT OFFICE 2,582,303

HOT-MOLDABLE COMPOSITIONS COMPRISING MELAMINE-FORMALDEHYDE RESIN AND ACRYLONITRILE COPOLYMER

Henry P. Wohnsiedler, Darien, and Edward L. Kropa, Old Greenwich, Conn., assignors to American Cyanamid Company, New York, N. Y., a corporation of Maine No Drawing. Application October 16, 1947, Serial No. 780,296

16 Claims. (Cl. 260—45.2)

This invention relates to new and useful hot-moldable (hot-formable) compositions and to products comprising the molded (shaped) compositions. More particularly the invention is concerned with hot-moldable, substantially homogeneous compositions comprising (1) a heat-curable melamine-formaldehyde resin and (2) a thermoplastic product of polymerization of a polymerizable mass including acrylonitrile and at least one compound selected from the class consisting of lower alkyl acrylates and N-mono-(lower alkyl) acrylamides, whereby molded products having improved properties, e. g., increased toughness (reduced brittleness) combined with dimensional stability, resistance to crazing and cracking, and good electrical properties, are obtained. The invention is directed specifically to such compositions wherein the acrylonitrile constitutes at least about 25% by weight of the aforementioned polymerizable mass, for example from about 30 to about 90% by weight of the said mass, and the ingredients of (1) and (2) are present in the composition in the ratio of, by weight, from about 45 to about 95 parts of the former to from about 55 to about 5 parts of the latter, more particularly in the weight ratio of from 50 to 85 parts of the former to from 50 to 15 parts of the latter. The scope of the invention also includes the products obtained by molding, that is, forming or shaping, the aforementioned hot-moldable compositions.

Molding (moldable) compositions containing a heat-curable (heat-convertible) melamine-formaldehyde resin were known prior to our invention, the molded products being characterized by, for example, outstanding resistance to heat and arcing and by their low water-absorption values. Such compositions and products are described, for instance, in Widmer et al. U. S. Patent No. 2,310,004. It is suggested in this patent that various modifiers may be incorporated into the compositions, among which are mentioned compounds capable of reacting with aldehydes to form resins, specifically phenols, urea, thiourea, cyanamide, dicyandiamide, sulfonamides and aniline. Such compounds are co-reacted with the other reactants or intercondensed into a partial reaction product of the primary reactants to form mixed condensation products. It also is suggested in this patent that dyestuffs, filling materials, plasticizers and water-repelling agents may be added at any stage of the condensation reaction.

It also was suggested prior to our invention that monomeric acrylonitrile be employed as a modifier of reaction products of ingredients comprising a preformed polymethylol melamine and a halogenated acetamide; or of reaction products of ingredients comprising an aminotriazine, e. g., melamine, an aldehyde, e. g., formaldehyde, and certain halogenated nitriles, halogenated amides or halogenated acetones. However, to the best of our knowledge and belief it was not known or suggested prior to our invention that substantially homogeneous, hot-moldable compositions, which can be formed, as by molding, extruding, calendering, etc., to yield products comprising a cured, modified melamine-formaldehyde resin having improved properties, could be obtained by admixing or blending, e. g., under heat, (1) a heat-curable melamine-formaldehyde resin and (2) a thermoplastic product of polymerization of a polymerizable mass including at least about 25% by weight thereof of acrylonitrile and the remainder a lower alkyl acrylate or an N-mono-(lower alkyl) acrylamide or a mixture of such an acrylate and acrylamide, as broadly described in the first paragraph of this specification and more fully hereinafter.

The present invention is a specific improvement upon the invention disclosed and claimed in the copending application of Edward L. Kropa and John P. Dunne, Serial No. 780,297, filed concurrently herewith, now Patent No. 2,541,927, dated February 13, 1951. It is based on our discovery that thermoplastic polymerization products or copolymers of the kind described in the first paragraph of this specification can be incorporated into filled or unfilled compositions comprising a heat-curable (thermosetting) melamine-formaldehyde resin to yield substantially homogeneous molding compositions which can be molded under heat to produce molded products having improved properties, e. g., increased toughness (reduced brittleness) combined with dimensional stability, resistance to cracking and crazing, low mold shrinkage, and good electrical properties. The acrylonitrile copolymer should be employed in a ratio, by weight, corresponding to not less than approximately 5 parts thereof for each 95 parts of the heat-curable melamine-formaldehyde resin in order to effect a material improvement in the toughness and other desirable properties of the molded product. On the other hand, the copolymer should not be used in a ratio, by weight, exceeding approximately 55 parts thereof for each 45 parts of the heat-curable melamine-formaldehyde resin, since otherwise the composition is lacking in the desired molding and curing characteristics, and the physical and electrical properties of the molded product are materially impaired as compared with a product similarly made from an unmodified melamine-formaldehyde molding composition.

In the field of melamine-formaldehyde molding compositions, both of the industrial grade and decorative types, improvements in dimensional stability and toughness of the molded article are often desirable in certain applications. An improvement in dimensional stability is sometimes needed to offset dimensional changes and improvements in both dimensional stability and toughness are needed to offset cracking around inserts and cracking or crazing resulting from stresses or dimensional change. The aforementioned copolymers of acrylonitrile and a lower alkyl acrylate or an N-mono-(lower alkyl) acrylamide have been found to be particularly useful in melamine-formaldehyde molding compositions, since the blend of the two materials provides a moldable composition from which can be made molded articles having a combination of properties (e. g., toughness combined with dimensional stability and crack and craze resistance) different from that of the components of the composition when molded separately and different from what normally would be expected from the known properties of the individual components.

Good results are obtained with hot-moldable compositions which are substantially homogeneous blends of ingredients comprising (1) a heat-curable melamine-formaldehyde resin and (2) a thermoplastic product of polymerization of a mixture of acrylonitrile and at least one compound selected from the class consisting of lower alkyl acrylates and N-mono-(lower alkyl) acrylamides, the acrylonitrile constituting from about 30 to about 90% by weight of the said mixture, and the ingredients of (1) and (2) being present in the said composition in the ratio of, by weight, from 50 to 85 parts of the former to from 50 to 15 parts of the latter.

It was quite surprising and unexpected that copolymers of acrylonitrile of the kind described in the first paragraph of this specification could be compounded, as by dry blending followed by hot milling, with a heat-curable melamine-formaldehyde resin in the presence or absence of fillers and/or other conventional components of molding compositions, especially since many of such polymerization products, e. g., high-molecular-weight copolymers containing a high percentage of combined acrylonitrile, are generally considered to be intractable materials that can be softened only at very high temperatures and pressures. Furthermore, many of these copolymers, especially those containing more than 65% by weight thereof of acrylonitrile, are soluble in only a relatively few solvents. Hence it would not be expected and could not be predicted that substantially homogeneous compositions could be obtained by hot blending a thermoplastic polymerization product or copolymer of the kind with which our invention is concerned and a heat-curable melamine-formaldehyde resin.

The homogeneity obtained may be attributed in part to the lower fusion point of the copolymers as compared with polyacrylonitrile. This permits an actual fusion of the modifying copolymer with the melamine resin during the rolling and blending operation so that the two components lose their identity, the one being dispersed in the other on a molecular order of dispersion. Copolymers of a lower alkyl acrylate, specifically ethyl acrylate, and acrylonitrile in a weight ratio of 2:1 soften, for example, at temperatures within the range of 115°–145° C. At a weight ratio of 1:1 softening occurs to a lesser extent at these temperatures. Compatibility between the primary resin and modifier falls off slightly, however, at the higher ethyl acrylate content. Hence copolymers having a higher ratio of ethyl acrylate (or equivalent monomer) to acrylonitrile than 2:1 are less desirable. Similar considerations apply to copolymers of acrylonitrile and an N-mono-(lower alkyl) acrylamide, specifically N-n-butyl acrylamide. At a weight ratio of 65:35 of N-n-butyl acrylamide to acrylonitrile the softening point of the copolymer is lower than at a 50:50 weight ratio, and this is a prevailing factor for optimum dispersibility.

It is believed that the results obtained by practicing our invention are due, at least to some extent, to the affinity between the nitrile (—CN) groups in the acrylonitrile copolymer and the triazine nucleus, which contains

groups, of the melamine-formaldehyde resin. It is known that the —CN groups in an acrylonitrile polymer undergo polymerization reactions at elevated temperatures, and hence during hot blending of the copolymeric acrylonitrile with the melamine-formaldehyde resin the former, which may be represented by R—CN where R represents the polymer residue, may undergo further polymerization through the nitrile groups to yield a polymerization product represented by

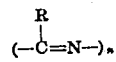

which is more compatible or more easily dispersed in the heat-curable melamine resin than the starting polymerization product.

In carrying our invention into effect a thermoplastic copolymer of acrylonitrile and a lower alkyl acrylate or an N-mono-(lower alkyl) acrylamide (or a mixture of such an acrylate and acrylamide) is prepared, for example by methods now well known to those skilled in the art or by more recently discovered methods. In the preparation of such copolymers a mixture of monomers comprising, by weight, at least about 25% and preferably not less than 40 or 50% of acrylonitrile is employed. For instance, the monomeric mixture may contain from 60 to 90 or 95% by weight of acrylonitrile. Illustrative examples of lower alkyl acrylates that may be used are methyl, ethyl, propyl, isopropyl, n-butyl, isobutyl, sec.-butyl, amyl, etc., acrylates. Illustrative examples of N-mono-(lower alkyl) acrylamides that may be employed are N-monomethyl, -ethyl, -propyl, -isopropyl, -n-butyl, isobutyl, -sec.-butyl, -amyl, etc., acrylamides.

Any suitable method of polymerizing the mixture of monomers may be used. Different methods of preparing the copolymers are given by way of illustration in the examples which follow. The polymerization may be effected in the presence of a plasticizer for the polymerization product as disclosed and claimed in the copending application of Walter M. Thomas, Serial No. 780,309, also filed concurrently herewith, now Patent No. 2,558,396, dated June 26, 1951. Other polymerization methods, however, also may be employed, e. g., methods such as those described in Bauer et al. U. S. Patent No. 2,160,054. The acrylonitrile copolymer may be of any suitable molecular weight, but ordinarily will be within the range of 15,000 to 300,000 or higher, as calculated from viscosity measurements using the Staudinger equation (reference: U. S. Patent No. 2,404,713).

The heat-curable melamine-formaldehyde resins used in practicing our invention are prepared by known methods, for instance as described in Widmer et al. U. S. Patent No. 2,310,004. In preparing such products the ratio of formaldehyde to melamine may be varied as desired or as conditions may require, but ordinarily will be within the range of from about 1.1 to about 9 mols of the former per mol of the latter. The reaction may be effected under acidic, neutral or alkaline conditions, but usually the initial reaction is carried out under neutral or alkaline conditions. The use of modifying reactants, e. g., urea, thiourea, dicyandiamide, etc., is not precluded, but if such reactants are employed it is preferred that they constitute a minor mol proportion of the mixed or total formaldehyde-reactable materials; that is, the melamine reactant should constitute a major mol proportion (more than 50 mol per cent) and the modifying reactant a minor mol proportion (less than 50 mol per cent) of the combined substances which are reactable with the formaldehyde. The formaldehyde reactant is generally used in the form of an aqueous solution. Paraformaldehyde, trioxane or other compounds engendering formaldehyde may be employed instead of aqueous formaldehyde.

We prefer to use a water-soluble, heat-curable melamine-formaldehyde resin (or resinifiable compound) obtained by effecting reaction, under neutral or alkaline conditions, between an aqueous solution of formaldehyde and melamine in the ratio of 1½ to 3, usually about 2, mols of the former per mol of the latter.

The polymerization product and the heat-curable melamine-formaldehyde resin, with or without fillers or other ingredients commonly used in the preparation of molding compositions, are compounded or blended together, for instance by mixing in suitable mixing equipment, e. g., a Banbury mixer, a ribbon-type blender, a ball mill, etc., followed by milling or sheeting on differential rolls (one of which is generally hotter than the other), thereby to obtain a substantially homogeneous composition. During the compounding operation, e. g., while sheeting on heated differential rolls, the mixture is heated to a temperature at least sufficiently high to soften the acrylonitrile copolymer, e. g., at an average temperature of about 100° to about 150° C. Such heating facilitates the dispersion of the copolymeric acrylonitrile and simultaneously therewith slightly advances the cure of the heat-curable melamine-formaldehyde resin. In no case are the temperature and time of compounding sufficient to convert the heat-curable melamine-formaldehyde resin to a substantially infusible state. However, as has been indicated, the temperature should be sufficiently high to soften the acrylonitrile copolymer and to disperse it in the melamine resin. As milling proceeds the clearance between the rolls may be adjusted, if desired, thereby to provide a further control of the temperature of the mix during milling.

Illustrative examples of fillers that may be incorporated into the molding composition at any suitable stage of its manufacture are alpha-cellulose, wood flour, walnut shell flour, asbestos in the form of a powder or short or long fibers, finely divided silicon carbide, carbon black, diatomaceous earth, slate dust, powdered rutile, powdered or flake mica, powdered quartz, cloth cuttings (e. g., cuttings of silk, rayons, wool, linen, cotton, nylon or of cloth made from glass fibers or from polymeric or copolymeric acrylonitrile fibers, etc.), ground cork, sand, etc. If desired, the filler and melamine-formaldehyde resin may first be compounded or blended together, after which the acrylonitrile copolymer is incorporated therewith under heat. The proportions of filler may be varied as desired or as conditions may require. Thus, depending, for instance, upon the particular filler employed and the intended use of the molded article, the filler may constitute, for example, from 5 to 80% by weight of the molding composition.

Dyes, pigments, plasticizers, e. g., succinonitrile, glutaronitrile, phthalonitrile, $\beta,\beta'$-dicyanoethyl ether, etc., curing agents (e. g., phthalic anhydride, ammonium chloride, ammonium silicofluoride, ammonium borofluoride, etc.), and mold lubricants (e. g., zinc stearate, etc.) also may be introduced into the molding composition, e. g., by mixing with either of the primary components before they are admixed with each other or conjointly with the acrylonitrile copolymer and heat-curable melamine-formaldehyde resin when they are compounded or blended together. Additional examples of plasticizers that may be employed are given in the aforementioned copending application of Walter M. Thomas, Serial No. 780,309, filed concurrently herewith.

In order that those skilled in the art better may understand how the present invention may be carried into effect, the following examples are given by way of illustration and not by way of limitation. All parts and percentages are by weight. The melamine-formaldehyde resin used in all of the examples was a water-soluble resin obtained by effecting reaction under alkaline conditions between an aqueous solution of formaldehyde and melamine in the ratio of approximately 2 mols of the former to 1 mol of the latter.

Example 1

A copolymer of 212 parts of acrylonitrile and 200 parts of ethyl acrylate, that is, in the ratio of about 2 mols of the former to 1 mol of the latter, was prepared as follows:

The acrylonitrile and ethyl acrylate were dissolved in 424 parts of 2B ethyl alcohol containing 2.06 parts of benzoyl peroxide. The solution was stirred and heated to the boiling point, the vapors being condensed and returned to the polymerization vessel. After heating for 15 minutes some copolymer formed and was precipitated, the quantity thereof increasing as copolymerization proceeded over a 6-hour period. Heating was then discontinued, as maximum copolymer formation appeared to have been obtained. The precipitated copolymer was separated, washed with alcohol and water, dried at 60° C., and used in making a molding composition as described below:

| | Parts |
|---|---|
| Heat-curable melamine-formaldehyde resin | 850 |
| Ethyl acrylate-acrylonitrile copolymer | 150 |
| Zinc stearate | 10 |

The zinc stearate and the melamine-formaldehyde resin were thoroughly dry mixed together for 30 minutes. The resulting mixture and the copolymer were then milled together on differential rolls having 60 mils clearance between the rolls. The fast roll was heated to about 132°–133° C. and the slow roll to about 97°–98° C. The copolymer was added gradually to the resin-zinc stearate mixture over a period of 2½ minutes. The total milling time was 12½ minutes. The resulting sheet material, which was a translucent product having a light cream color, was broken and crushed into granules. Samples of the granular molding composition were molded for 10 minutes at 155° C. under a pressure of about 3750 pounds per square inch. The composition showed good plastic flow during molding. The mold shrinkage was only 5.1 mils per inch as compared with a shrinkage of 8 to 9 mils per inch for the unmodified melamine resin when similarly processed. The tough characteristics of the copolymer were carried through into the molded articles. When a molded piece was immersed in boiling water for 30 minutes it absorbed 0.55% of water. The molded articles showed improved flexibility, that is, a lower modulus of elasticity, as compared with articles similarly made from unmodified melamine-formaldehyde molding compositions, that is, compositions containing the melamine-formaldehyde resin but no acrylonitrile-ethyl acrylate copolymer.

*Example 2*

A copolymer of 210 parts of acrylonitrile and 390 parts of ethyl acrylate, that is, in approximately equal molar proportions, was prepared as follows:

The freshly purified materials were emulsified by adding the combined monomers dropwise to a stirred, aqueous solution containing a small amount of a surface-active agent. The latter solution was made by adding a 25% aqueous solution of dioctyl sodium sulfosuccinate to 900 parts of deionized water. A catalyst in solution was added at the same time. This solution contained 0.6 part of ammonium persulfate and 0.42 part of sodium bicarbonate in 50 parts of water. The mixed monomers and catalyst solution were added at a uniform rate over a period of 1½ hours while heating the reaction mixture on a steam bath. The temperature of the mass reached 78° C. within 20 minutes, and varied between 78° and 82° C. during the remaining 70 minutes. Thereafter the temperature was lowered and held at 50° to 65° C. for 80 minutes. The free monomeric material in the reaction mass was removed by steam distillation. A good emulsion was obtained. This was cooled, frozen and then re-warmed. The finely divided precipitate of copolymer was filtered off, washed with water, air-dried, and then incorporated into a molding composition as described below:

| | Parts |
|---|---|
| Heat-curable melamine-formaldehyde resin | 800 |
| Acrylonitrile-ethyl acrylate copolymer | 200 |
| Zinc stearate | 10 |

The same general procedure was followed as described under Example 1 with the exception that the slow roll was heated to about 105° C., the fast roll to about 135° C. and the total milling time was 8 minutes. The copolymer blended in satisfactorily after milling for only three minutes, the blend immediately assuming an elastic character with marked fiber-forming and -drawing properties. At the end of the milling period the substantially homogeneous composition was removed from the rolls as a thin, leathery, tough, semi-opaque sheet material which showed no tendency to stick to the rolls. The cold sheet, which also was tough, was broken and granulated. When molded and tested as described under Example 1, the test specimens absorbed 0.79% of water and had a modulus of elasticity of 0.78 as compared with 1.05 for a molded article of Example 1 and 1.33 for a molded article made from the unmodified (copolymer-free) melamine-formaldehyde molding composition.

*Example 3*

Same as Example 2 with the exception that 700 parts of heat-curable melamine-formaldehyde resin and 300 parts of acrylonitrile-ethyl acrylate copolymer were used, and the total milling time was 7 minutes. The slow roll was at a temperature of 107° C. when milling was started and 87° C. at the end, while the temperature of the fast roll was 140° C. at the beginning and 143° C. at the end of the milling period. The material was removed from the rolls as a semi-opaque, glassy white, tough, leathery, dense sheet, about ⅛-inch thick. When cold, it was flexible and slightly more glossy than the corresponding material of Example 2. The modulus of elasticity of a test specimen which had been molded from a sample of the granuar molding composition as described under Example 1 was 0.76.

*Example 4*

A copolymer of acrylonitrile and ethyl acrylate was obtained in the form of beads as follows:

A mixture of 250 parts each of acrylonitrile and ethyl acrylate having dissolved therein 1 part of benzoyl peroxide was mixed with 2000 parts of water having dispersed therein 2.5 parts of bentonite in a round-bottomed reaction vessel provided with a reflux condenser. The resulting mixture was heated on a steam bath while stirring with an anchor stirrer at 250 R. P. M. Vigorous refluxing occurred, but after heating for 2½ hours refluxing ceased. The beads of ethyl acrylate-acrylonitrile copolymer which settled out when stirring was stopped and the mass allowed to cool were separated by pouring the mass through 40- and 60-mesh screens. Most of the beads were retained on the 40-mesh screen. The separated beads were washed well with water, air dried, and the dried beads used in making a molding composition as described below:

| | Parts |
|---|---|
| Heat-curable melamine-formaldehyde resin | 800 |
| Acrylonitrile-ethyl acrylate copolymer | 200 |
| Zinc stearate | 10 |

The same general procedure was followed as described under Example 1. The temperature of the slow roll was 50° C. at the beginning of milling and 65° C. at the end, while the fast roll was at a temperature of 143°–145° C. during the milling period. The total milling time was 9½ minutes. The blend was removed from the rolls as a cream-colored, slightly glossy sheet material having good plasticity. It was broken, granulated, molded and tested as described under Example 1. The water-absorption value was 0.49% and the modulus of elasticity was 0.93. The molded articles were semi-opaque, had a smooth surface and a good gloss. The molding composition showed good flow characteristics during molding.

Example 5

A plasticized copolymer of acrylonitrile and ethyl acrylate which had been prepared in accordance with the process disclosed and claimed in the aforementioned copending application of Walter M. Thomas, Serial No. 780,309, filed concurrently herewith, was used in this example. The plasticized copolymer was prepared from the following ingredients:

| | Parts |
|---|---|
| Acrylonitrile | 200.0 |
| Ethyl acrylate | 200.0 |
| o-Cresyl glyceryl ether | 100.0 |
| Benzoyl peroxide | 0.8 |

These components were mixed together to yield a clear fluid solution, which then was mixed with 2000 parts of water in which 2.5 parts of bentonite previously had been dispersed. The resulting dispersion was heated and stirred under reflux for 8 hours. The fine, spherical particles or beads of plasticized copolymer that formed were screened off and dried at 50°–60° C. From an analysis of the product for nitrogen and hydroxyl groups the composition of the beads was indicated to be as follows:

| | Per cent, approx. |
|---|---|
| Combined acrylonitrile (from nitrogen analysis) | 35.2 |
| o-Cresyl glyceryl ether (from hydroxyl analysis) | 20.8 |
| Combined ethyl acrylate (by difference) | 44.0 |

At a given temperature and pressure in the range of 100° to 150° C. and 200 to 1500 pounds per square inch, about 15 times as much flow was obtained with the above plasticized copolymer as compared with an unplasticized copolymer similarly prepared from the same proportions of acrylonitrile and ethyl acrylate.

The plasticized copolymer was employed in making a molding composition as described below:

| | Parts |
|---|---|
| Heat-curable melamine-formaldehyde resin | 750 |
| Plasticized copolymer of acrylonitrile and ethyl acrylate | 250 |
| Zinc stearate | 10 |

The same general procedure was followed as described under Example 1. The slow roll was heated to about 98° C., the fast roll to about 140° C., and the total milling time was 8½ minutes. After 5 minutes' milling, the beads of plasticized copolymer were well dispersed in the resin, yielding a tough, fibrous composition having a good sheen. At the end of the milling period the blend was removed from the rolls as an ivory-colored, translucent, continuous sheet having good overall plasticity and showing evidence of good compatibility between the resin and the plasticized copolymer. The sheet was broken and granulated. A sample of the granular molding composition was molded as described under Example 1, yielding molded articles having a modulus of elasticity of 0.78 (the test bar was molded under a pressure of about 2000 pounds per square inch) and a water-absorption value of 0.71% after immersion in boiling water for 30 minutes of a disc which had been molded for 10 minutes at 155° C. under a pressure of about 3750 pounds per square inch. The molding composition showed good plastic flow during molding. The mold shrinkage was only 5.9 mils per inch as compared with 8 to 9 mils per inch for the unmodified melamine-formaldehyde resin when similarly processed. The molded articles were substantially uniform in composition and had a good surface appearance.

Example 6

A bead-type of copolymer of equal parts of acrylonitrile and ethyl acrylate was prepared in essentially the same manner as described under Example 4. This copolymer was used in making a molding composition as described below:

| | Parts |
|---|---|
| Heat-curable melamine-formaldehyde resin | 450 |
| Acrylonitrile-ethyl acrylate copolymer | 550 |
| Zinc stearate | 10 |

The above ingredients were thoroughly dry mixed together and the resulting mixture then was transferred to differential rolls maintained at 146° C. After milling for 3 minutes the mass began to fuse together, yielding a material resembling pale crepe rubber. At the end of 3½ minutes' milling the blend was removed from the rolls as a cream-colored mass having good flexibility and toughness. The blend was granulated and a test bar molded therefrom by heating for 10 minutes at about 155° C. under a pressure of about 2000 pounds per square inch. The modulus of elasticity of the molded specimen was 0.72.

Example 7

A copolymer of approximately 88.7 parts of acrylonitrile and 11.3 parts of n-butyl acrylate, that is, in the ratio of 1 mol of the former to 0.05 mol of the latter, was prepared by emulsion copolymerization technique in a manner similar to that described under Example 2 with reference to the production of a copolymer of acrylonitrile and ethyl acrylate. The emulsion containing 18% of total solids was frozen in a mixture of acetone and solid carbon dioxide, warmed to room temperature and allowed to stand for about 16 hours. The finely divided particles of copolymer were filtered from the resulting slurry, thoroughly washed with water, and then dried at 70°–80° C. for 4 to 5 hours. The finely divided, dried copolymer was used in making a molding composition as described below:

| | Parts |
|---|---|
| Heat-curable melamine-formaldehyde resin | 750 |
| Acrylonitrile-n-butyl acrylate copolymer | 250 |
| Zinc stearate | 10 |

The same general procedure was followed as described under Example 1 with the exception that the slow roll was heated to about 100°–103° C., the fast roll to about 139°–140° C. and the total heating time was 7½ minutes. The resulting cream-colored sheet material had good overall plasticity and showed no tendency to stick to the rolls. The sheet was broken, granulated and samples thereof molded and tested as described under Example 1. The test specimens absorbed 0.28% water and a modulus of elasticity of 1.01.

Example 8

A copolymer of acrylonitrile and N-n-butyl acrylamide was prepared as follows:

One hundred and forty (140) parts of acrylonitrile and 260 parts of N-n-butyl acrylamide in purified form were mixed with a solution of 200 parts of water, 0.2 part of sodium bicarbonate, 0.2 part of ammonium persulfate and 12 parts of a dispersion agent, specifically the sodium salt of a sulfated mixture of lauryl and myristyl alcohols, and the whole was stirred rapidly while heating under reflux on a steam bath. Heating of the emulsion was continued at about 77° C. for 8 hours, an additional 0.2 part of ammonium persulfate being added after 6 hours' heating. The emulsion was steamed to remove any monomeric material that may have been present, after which it was frozen, thawed, and the finely divided precipitated copolymer then separated, washer with water and dried at 40°–60° C. The dried copolymer was used in making a molding composition as described below:

| | Parts |
|---|---|
| Heat-curable melamine-formaldehyde resin | 800 |
| N-n-butyl acrylamide-acrylonitrile copolymer | 200 |
| Zinc stearate | 10 |

The same general procedure was followed as described under Example 1. Both the slow and fast rolls were heated to 105° C., and the total milling time was 7½ minutes. The copolymer began to soften and to blend into the resin. At the end of the milling period the material was removed from the rolls as a tough, white, semi-opaque sheet having a fairly good gloss and a good body texture. After granulating the sheet, samples thereof were molded and tested as described under Example 1. The water-absorption value was 1.2% and the modulus of elasticity was 0.93.

Example 9

Same as Example 8 with the exception that a copolymer of approximately 50 parts each of acrylonitrile and N-n-butyl acrylamide was used. The slow roll was heated to 105° C. and the fast roll to 145° C. After 7½ minutes' milling the blend came off the rolls as a very tough sheet. Test specimens molded from the granulated sheet gave a water-absorption value of 0.95% and a modulus of elasticity of 0.98. The mold shrinkage was 6.1 mils per inch as compared with 8 to 9 mils per inch for the unmodified melamine-formaldehyde resin when similarly processed.

Example 10

| | Parts |
|---|---|
| Heat-curable melamine-formaldehyde resin | 400 |
| Emulsion-polymerized copolymer of 54.7 parts of acrylonitrile and 34.5 parts of ethyl acrylate plasticized with 10.8 parts of o-cresyl glyceryl ether | 100 |
| Calcined asbestos | 500 |
| Zinc stearate | 10 |

All of the above ingredients were thoroughly dry mixed together for 30 minutes. The resulting mixture was then milled on differential rolls, the fast roll being heated to 140° C. and the slow roll to about 80°–85° C. The total milling time was 5 minutes. The resulting sheet material was broken and crushed into granules. Samples of the granular molding composition were molded for 10 minutes at 155° C. under a pressure of about 3750 pounds per square inch. The composition showed good plastic flow during molding. Tough, molded articles having a good surface appearance and which were substantially homogeneous throughout were obtained. The mold shrinkage was 2.1 mils per inch as compared with 5.4 mils per inch for a similar asbestos-filled melamine-formaldehyde molded piece containing no copolymer. The flexural strength of a molded specimen was 9100 pounds per square inch (test method: A. S. T. M. D 650–42T). The electrical characteristics including arc resistance and dielectric strength also were very good.

The hot-moldable (hot-formable) compositions of this invention may be shaped or formed, as by molding, extruding, calendering, etc., at temperatures ranging, for example, from 130° to 180° C. and at pressures varying from 1000 to 20,000 pounds or more per square inch. They may be molded by compression-, injection-, or transfer-molding technique. The molding (moldable) compositions show good flow characteristics during molding, and the molded articles are substantially homogeneous throughout and have a good surface appearance. Furthermore, they are tougher, as evidenced by increased flexibility (lower modulus of elasticity), than melamine-formaldehyde molding compositions containing no copolymeric acrylonitrile modifier such as is used in practicing our invention. Also, as a result of their improved dimensional stability and toughness, the tendency to crack (e. g., around inserts) or craze as a result of stresses or dimensional change is obviated or minimized.

Since the moldable compositions of this invention have good flow characteristics during molding, they are especially adapted for use in the molding of intricate parts. Thus they may be employed in molding lighting fixtures, parts of electrical appliances (including electrically insulating parts), bathroom and other household fixtures and ornamental objects of both simple and intricate designs. They also may be used in forming surface sheets upon plywood and other laminated articles, and as an overlay for other plastic and other structural materials.

Our new compositions are especially suitable for use as pigmented or unpigmented surfacing compounds in the production of decorative laminates. A typical pigmented composition is made by ball-milling the following ingredients for 16 hours:

| | Parts |
|---|---|
| Homogeneous blend of 65 to 80 parts of a heat-curable melamine-formaldehyde resin and 35 to 20 parts of a copolymer of acrylonitrile and ethyl acrylate in a ratio of from 1 to 2 parts of the latter for each part of the former | 220 |
| Pigment, e. g., titanium dioxide | 180 |
| Water or a 3:1 mixture of water and alcohol | 600 |

The resulting mix is generally a creamy paste suitable for roll-coating application or, after further dilution, by spray coating. The pigmented paste may be applied to a resin-impregnated paper, e. g., a pigmented paper containing 50% by weight of melamine-formaldehyde resin and dried to a content of 4 to 5% of volatile matter. The paste may be applied to the paper by roll coating in about 0.01" thickness or in sufficient thickness to give a final dry coat weight or 14 to 18 grams per square foot. The coated paper is dried under tension for about 10 to 20 minutes at about 90° to 105° C. or until the volatile content of the dried sheet is about 3 to 4%. The dried sheet or superimposed sheets are pressed onto core stock, e. g., a laminate of phenolic resin-impregnated kraft paper, for instance by heating for 30 minutes at 150° C. under a pressure of 1100 pounds per square inch.

The compositions of our invention in the form of surfacing pastes have satisfactory handling characteristics, and yield surfaced articles having good gloss and general appearance, combined with resistance to wear.

The terms "molding" and "moldable" as used herein (including the claims) are employed in a broad sense and are intended to include within their meanings any means of forming or shaping the compositions to which the expressions apply, including molding (in the more limited meaning of the word), calendering, extruding or any other means of forming the composition to a desired shape. Likewise, the term "molded" as used herein has a correspondingly broad meaning.

We claim:

1. A composition as in claim 11 wherein the polymerization product of (2) has a molecular weight within the range of about 15,000 to about 300,000.

2. A composition as in claim 11 which also includes a plasticizer for the ingredients of (1) and (2).

3. A composition as in claim 2 wherein the plasticizer is o-cresyl glyceryl ether.

4. A composition as in claim 11 wherein the polymerization product of (2) is a copolymer of acrylonitrile and a lower alkyl acrylate, the acrylonitrile constituting from about 30 to about 90% by weight of the said copolymer and the said lower alkyl acrylate containing from one to five carbon atoms, inclusive, in the lower alkyl grouping thereof.

5. A composition as in claim 4 wherein the lower alkyl acrylate is ethyl acrylate.

6. A composition as in claim 11 wherein the polymerization product of (2) is an N-mono-(lower alkyl) acrylamide, the acrylonitrile constituting from about 30 to about 90% by weight of the said copolymer and the said N-mono-(lower alkyl) acrylamide containing from one to five carbon atoms, inclusive, in the lower alkyl grouping thereof.

7. A composition as in claim 6 wherein the N-mono-(lower alkyl) acrylamide is N-n-butyl acrylamide.

8. A composition as in claim 12 wherein the filler comprises asbestos.

9. A product comprising the molded composition of claim 13 and in which the melamine-formaldehyde resin is in a cured state.

10. A hot-moldable, substantially homogeneous composition comprising (1) a heat-curable melamine-formaldehyde resin which is soluble in water and which is obtained by effecting reaction under alkaline conditions between an aqueous solution of formaldehyde and melamine in the ratio of approximately 2 mols of the former to 1 mol of the latter and (2) a thermoplastic product of polymerization of acrylonitrile and ethyl acrylate in a weight ratio of about 215 parts of the former to about 200 parts of the latter, the ingredients of (1) and (2) being present in the said composition in the ratio, by weight, of from about 85 parts of the former to about 15 parts of the latter.

11. A hot-moldable, substantially homogeneous composition comprising (1) a heat-curable melamine-formaldehyde resin and (2) a thermoplastic product of polymerization of a polymerizable mass including (a) acrylonitrile and (b) a different substance which is copolymerizable with the acrylonitrile of (a) and which is selected from the class consisting of lower alkyl acrylates containing from one to five carbon atoms, inclusive, in the lower alkyl grouping thereof, N-mono-(lower alkyl) acrylamides containing from one to five carbon atoms, inclusive, in the lower alkyl grouping thereof and mixtures of the said lower alkyl acrylates and N-mono-(lower alkyl) acrylamides, the ingredients of (a) and (b) being employed in a weight ratio corresponding to from about 25 to about 95 parts of the acrylonitrile of (a) to from about 75 to about 5 parts of the substance of (b), and the ingredients of (1) and (2) being present in the said composition in a weight ratio of from about 45 to about 95 parts of the former to from about 55 to about 5 parts of the latter.

12. A composition which is moldable under heat and which is a substantially homogeneous blend of ingredients comprising (1) a filler, (2) a heat-curable melamine-formaldehyde resin and (3) a thermoplastic product of polymerization of a polymerizable mass including (a) acrylonitrile and (b) a different substance which is copolymerizable with the acrylonitrile of (a) and which is selected from the class consisting of lower alkyl acrylates containing from one to five carbon atoms, inclusive, in the lower alkyl grouping thereof, N-mono-(lower alkyl) acrylamides containing from one to five carbon atoms, inclusive, in the lower alkyl grouping thereof and mixtures of the said lower alkyl acrylates and N-mono-(lower alkyl) acrylamides, the ingredients of (a) and (b) being employed in a weight ratio corresponding to from about 25 to about 95 parts of the acrylonitrile of (a) to from about 75 to about 5 parts of the substance of (b), and the ingredients of (2) and (3) being present in the said composition in the ratio of, by weight, from about 45 to about 95 parts of the former to from about 55 to about 5 parts of the latter.

13. A composition which is moldable under heat and which is a substantially homogeneous blend of ingredients comprising (1) a heat-curable melamine-formaldehyde resin and (2) a thermoplastic product of polymerization of a mixture of acrylonitrile and a different substance which is copolymerizable with the acrylonitrile and which is selected from the class consisting of lower alkyl acrylates containing from one to five carbon atoms, inclusive, in the lower alkyl grouping thereof, N-mono-(lower alkyl) acrylamides containing from one to five carbon atoms, inclusive, in the lower alkyl grouping thereof and mixtures of the said lower alkyl acrylates and N-mono-(lower alkyl) acrylamides, the acrylonitrile constituting from about 30 to about 90% by weight of the said mixture, and the ingredients of (1) and (2) being present in the said composition in the ratio of, by weight, from 50 to 85 parts of the former to from 50 to 15 parts of the latter, the said polymerization product of (2) imparting toughness to the molded composition.

14. A pigmented composition comprising the following ingredients in parts by weight:

| | Parts |
|---|---|
| Homogeneous blend of 65 to 80 parts of a heat-curable melamine-formaldehyde resin and 35 to 20 parts of a copolymer of acrylonitrile and ethyl acrylate in a ratio of 1 to 2 parts of the latter for each part of the former | 220 |
| Pigment | 180 |
| Water | 600 |

15. A composition as in claim 14 wherein the pigment is titanium dioxide.

16. A composition as in claim 14 wherein, instead of water, there is used a 3:1 mixture of, by weight, water and alcohol.

HENRY P. WOHNSIEDLER.
EDWARD L. KROPA.

REFERENCES CITED

The following references are of record in the file of this patent:

UNITED STATES PATENTS

| Number | Name | Date |
|---|---|---|
| 2,191,581 | Nowak et al. | Feb. 27, 1940 |
| 2,388,293 | Schroy et al. | Nov. 6, 1945 |
| 2,413,860 | Brookes | Jan. 7, 1947 |
| 2,463,032 | Hanson | Mar. 1, 1949 |